(12) United States Patent
Ott et al.

(10) Patent No.: US 12,415,180 B2
(45) Date of Patent: *Sep. 16, 2025

(54) TIP CUP

(71) Applicant: TECAN TRADING AG, Mannedorf (CH)

(72) Inventors: Philipp Ott, Steg (CH); Adrian Sager, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 1023 days.

This patent is subject to a terminal disclaimer.

(21) Appl. No.: 17/312,431

(22) PCT Filed: Dec. 20, 2019

(86) PCT No.: PCT/EP2019/086562
§ 371 (c)(1),
(2) Date: Jun. 10, 2021

(87) PCT Pub. No.: WO2020/127897
PCT Pub. Date: Jun. 25, 2020

(65) Prior Publication Data
US 2022/0080402 A1    Mar. 17, 2022

(30) Foreign Application Priority Data

Dec. 20, 2018  (WO) ............... PCT/US2018/066850
Dec. 20, 2018  (WO) ............... PCT/US2018/066857

(51) Int. Cl.
*B01L 3/02*   (2006.01)
*B03C 1/01*   (2006.01)
(Continued)

(52) U.S. Cl.
CPC ........... *B01L 3/0275* (2013.01); *B01L 3/0279* (2013.01); *B03C 1/01* (2013.01); *B03C 1/32* (2013.01);
(Continued)

(58) Field of Classification Search
CPC .... B01L 3/0275; B01L 3/0279; B01L 3/0217; B01L 2200/023; B01L 2200/025;
(Continued)

(56) References Cited

U.S. PATENT DOCUMENTS 3,545,932 A     12/1970  Gilford
6,146,881 A *   11/2000  Hering .................. B01L 3/0275
                                                          435/284.1
(Continued)

FOREIGN PATENT DOCUMENTS

EP    0701865 A1    3/1996
EP    0843176 A1    5/1998
(Continued)

OTHER PUBLICATIONS

Internationall Search Report and Written Opinion for corresponding PCT application No. PCT/EP2019/086562, mailed Apr. 7, 2020.

*Primary Examiner* — Jill A Warden
*Assistant Examiner* — Michael Stanley Gzybowski
(74) *Attorney, Agent, or Firm* — Notaro, Michalos & Zaccaria P.C.

(57) ABSTRACT

A pipette tip extension attachable to a pipette tip is disclosed. The pipette tip extension has a proximal end, a distal end, and an exterior wall extending between the proximal end and the distal end. The exterior wall has an outer side and an inner side and forms at the proximal end a reception aperture for inserting a pipette tip. The pipette tip extension also has a bottom at the distal end, an inner cavity enclosed by the inner side of the exterior wall and the bottom, and one or
(Continued)

more distance elements arranged at the inner side of the exterior wall and protruding into the inner cavity.

8 Claims, 9 Drawing Sheets

(51) Int. Cl.
    *B03C 1/32*     (2006.01)
    *G01N 35/10*     (2006.01)

(52) U.S. Cl.
    CPC ............ *G01N 35/10* (2013.01); *B01L 3/0217* (2013.01); *B01L 2200/023* (2013.01); *B01L 2200/025* (2013.01); *B01L 2200/026* (2013.01); *B01L 2300/0832* (2013.01); *B01L 2300/0858* (2013.01); *B01L 2300/18* (2013.01); *B01L 2400/0478* (2013.01); *G01N 2035/103* (2013.01)

(58) Field of Classification Search
    CPC ....... B01L 2200/026; B01L 2300/0832; B01L 2300/0858; B01L 2300/18; B01L 2400/0478; B03C 1/01; B03C 1/32; G01N 35/10; G01N 2035/103
    See application file for complete search history.

(56) References Cited

U.S. PATENT DOCUMENTS

| | | |
|---|---|---|
| 6,436,349 B1 | 8/2002 | Carey et al. |
| 2016/0195457 A1* | 7/2016 | Black .................... G01N 35/10 |
| | | 422/514 |

FOREIGN PATENT DOCUMENTS

| | | |
|---|---|---|
| WO | 2014/140640 A1 | 9/2014 |
| WO | 2016/073832 A1 | 5/2016 |

* cited by examiner

C-C

D-D

Fig. 2A
Fig. 2B
A-A
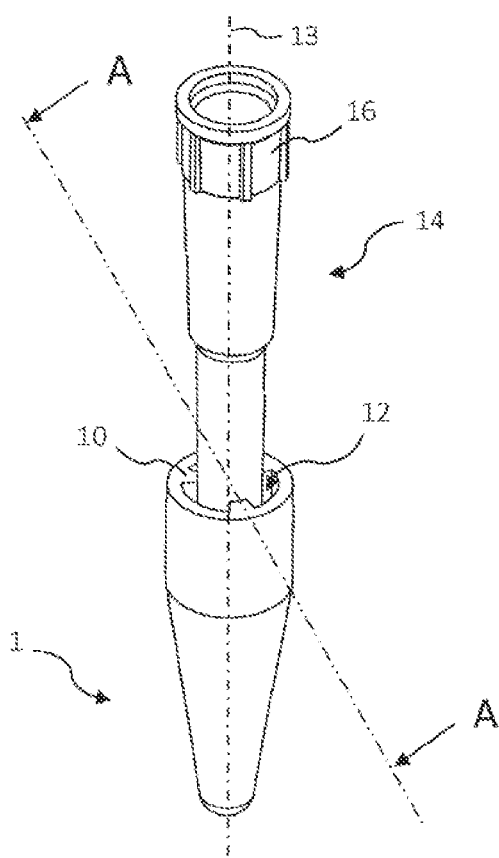
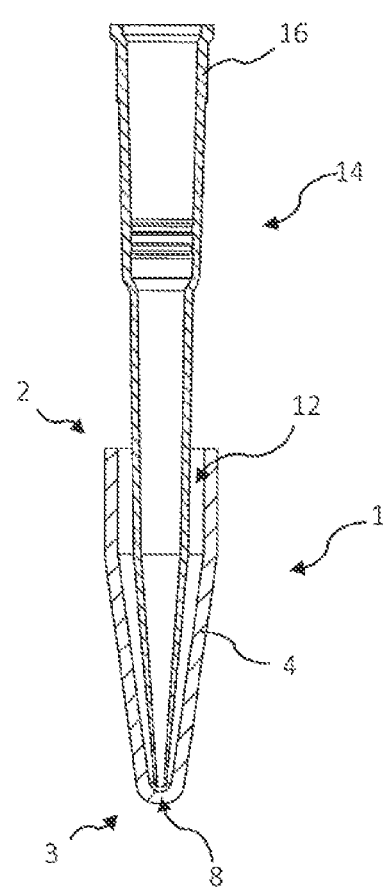

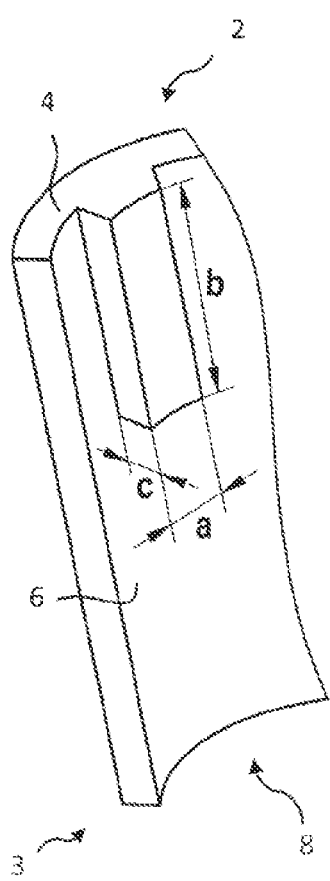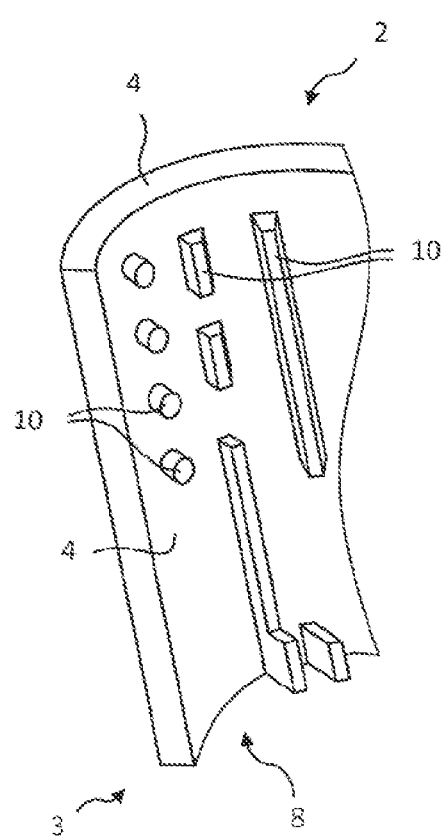

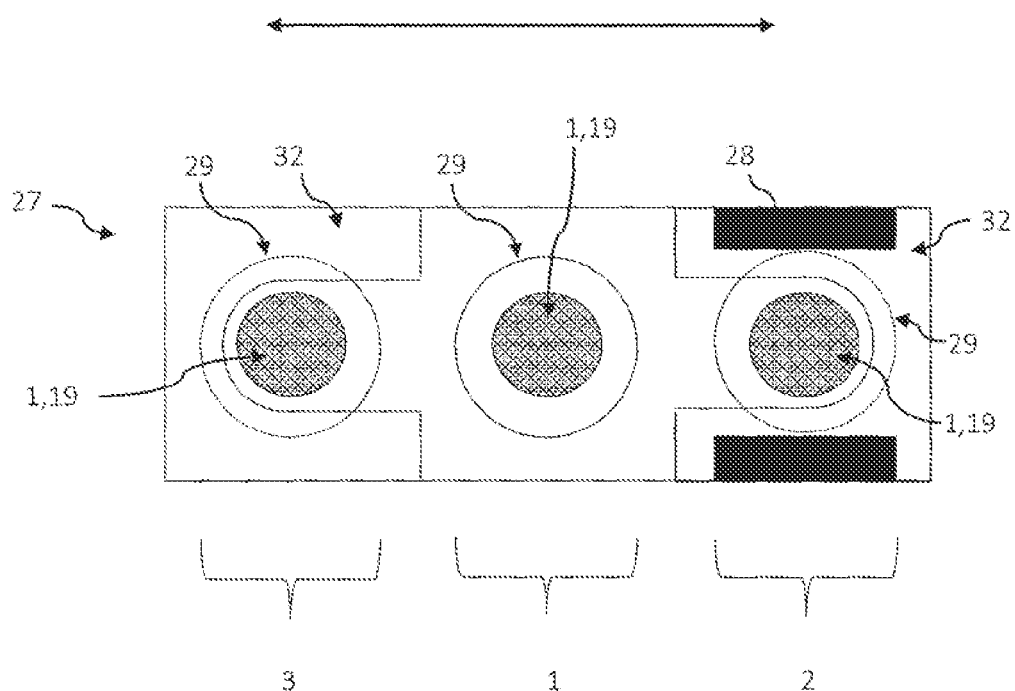

TIP CUP

TECHNICAL FIELD OF THE INVENTION

The current invention relates to a pipette tip extension which is attachable to a pipette tip. The current invention further relates to an assembly comprising a pipette tip and a pipette tip extension, and to a method of treating a sample in a liquid by using the pipette tip extension. The present invention claims the priority of the international patent application No. PCT/US18/66850, and of the international patent application No. PCT/US18/66857, both having been filed on Dec. 20, 2018.

DESCRIPTION OF THE RELATED ART

In the field of liquid handling, a number of different liquid handling tubes are used. In particular in the handling of liquids with biological material, the tubes are plastic tubes for single use, as they help in reducing the risk of contaminating such biological material. Such liquid handling tubes are usually configured to be closed by laboratory staff working on a laboratory bench, which staff are trained to apply the particular care for avoiding such contaminations. However, the handling of lids or caps is often disadvantageous in liquid handling automation. There have been efforts in automating for example in de- and recapping such liquid handling tubes, however, the solutions are always complicated so that the handling of such tubes in liquid automation remains disadvantageous. There are also solutions in which the tubes are aggregated for example in a specific tube carrier or as so-called microplates, which allow an easier handling by pipetting robots and are therefore automation-friendly. However, if individual tubes shall be used in automation, the processing still is complicated, in particular for example in the context of application development or small-batch-applications.

SUMMARY OF THE INVENTION

It is an object of the present invention to provide an alternative solution for liquid handling, which is practicable also in the use of automated liquid handling systems. In particular, it is an objective to provide an alternative liquid handling tube.

This problem is solved by a pipette tip extension which is attachable to a pipette tip, the pipette tip extension having the features of claim 1. Further embodiments of the pipette tip extension as well as an assembly of a pipette tip extension and a pipette tip and a method of treating a sample by using the pipette tip extension are defined by the features of further claims.

The pipette tip extension according to the invention is attachable to a pipette tip and comprises a proximal end, a distal end, and an exterior wall extending between the proximal end and the distal end. The exterior wall has an outer side and an inner side and forms at the proximal end a reception aperture for inserting a pipette tip. The pipette tip extension also comprises at the distal end a bottom. An inner cavity of the pipette tip extension is enclosed by the inner side of the exterior wall and the bottom.

The pipette tip extension further comprises one or more distance elements which are arranged at the inner side of the exterior wall and which protrude into the inner cavity. The one or more distance elements are dimensioned to establish a fluid uptake area adjacent to the inner side of the exterior wall and the bottom. Said fluid uptake area extends from the bottom up to the reception aperture and is in fluid connection with the surrounding atmosphere at the reception aperture.

The proximal end refers in connection with the pipette tip extension to the end of the pipette tip extension which is closest to a reception aperture into which a pipette tip may be inserted. Occasionally, the proximal end might also be addressed to as the upper end of the pipette tip extension. Accordingly, the distal end refers in connection with the pipette tip extension to the end of the pipette tip extension being more distant to the reception aperture for inserting a pipette tip. Thus, the distal end is opposite to the reception aperture, and might also be addressed to as a lower end or bottom end. In connection with a pipette tip, the term proximal end refers to the upper end of the pipette tip which is for use typically attached to a pipette and the associated pipetting channel, while the term distal end refers to the lower end of the pipette tip with an outlet opening for aspirating or dispensing a liquid.

The term "a pipette tip extension attachable/attached to a pipette tip" describes essentially the same situation as the term "a pipette tip insertable/inserted into the pipette tip extension". It is described here that the pipette tip extension is configured to be connectable to a pipette tip. This may be realized in that, in particular, the diameter of reception aperture and the dimension of the inner cavity formed by the exterior wall and the bottom are adapted to the dimensions of a pipette tip, which shall be inserted into the pipette tip extension. The dimensions of the reception aperture and the inner cavity allow the uptake of a specific pipette tip, and ensures according to the invention that a gap is formed between the outer wall of the inner pipette tip and the inner wall of the pipette tip extension, into which a fluid or liquid can be moved.

A suitable pipette tip may for example be a disposable pipette tip made of a plastic material, or of a so-called fixed pipette tip, made of a metal.

In the context of the present invention, a disposable pipette tip is a pipette tip which may be taken up and/or ejected for example by a liquid handling device automatically. It may be made of a plastic material, and the connection to the liquid handling device may be realized by slightly deforming the plastic to achieve a friction fit connection between the tip and the device.

In the context of the present invention, a fixed pipette tip may be connected to the liquid handling device mechanically by form fit, for example may be screwed to the device. Mounting and dismounting typically requires a manual interaction. A fixed pipette tip may be made of a metal to ensure a stable shape.

The one or more distance element(s) is/are configured to position an inserted pipette tip at a defined distance to the inner wall of the pipette tip extension, and thereby allows the formation of a fluid uptake area at the inner side of the exterior wall of the pipette tip extension also when a pipette tip is inserted. A distance element thus prevents that an inserted pipette tip fully abuts the inner side of the exterior wall of the pipette tip extension. The distance element(s) therefore function as spacers which allows the fluid uptake area being further limited by a pipette tip when such a pipette tip is inserted into the pipette tip extension.

One distance element is sufficient to space an inserted pipette tip apart from the inner side of the exterior wall for forming a channel between the outer side of the inserted pipette tip and the inner side of the pipette tip extension. This channel may take up a fluid which is to be moved between the pipette tip and the pipette tip extension. The use of two or more distance elements may be preferred to provide a seat for a pipette tip in which the pipette tip does not contact the inner side of the exterior wall.

Neither when using one nor when using more distance elements, a distance element does not extend circumferentially along the inner side of the exterior wall, so that the pipette tip extension or the fluid uptake area, respectively, is never closed towards the reception aperture. The reception aperture at the proximal end of the pipette tip extension is during use at least partially open and thus not completely closed, e.g. by a cover, a seal, the pipette tip it is attached to, or a combination thereof. By remaining in fluid connection to the surrounding atmosphere, sufficient pressure equalization is ensured when a liquid is dispensed from a pipette tip into the fluid uptake area of an attached pipette tip extension.

The distance elements subdivide the inner cavity into a fluid uptake area and a pipette tip hosting area, which correspond to the later position of an inserted pipette tip. The depth of each distance element, which corresponds to the length, by which the respective distance element protrudes from the inner wall of the pipette tip extension towards the medial axis, may in particular define the volume of liquid which may be taken up in the fluid uptake area.

In the context of the present invention, a fluid may be any type of liquid or gas, for example a liquid sample, a reagent, a buffer, etc. The fluid may also be a mixture of different liquids (e.g. an emulsion), a mixture of different gases, a mixture of a liquid and a gas (i.e. an aerosol), or a mixture of a liquid and a solid dispensed in said liquid (i.e. a suspension). Solid particles may for example be abrasive particles such a sand, or may be magnetic beats. The liquid may also be a solvent for molecules of interest.

The bottom is connected to the exterior wall at the distal end. Both, the bottom and the exterior wall, which extends circumferentially around a medial or longitudinal axis, respectively, form a common container-like structure which is attachable to a conventional pipette tip in a way that the pipette tip extension forms a cup for the end of the pipette tip which comprises a dispense aperture. However, the cup extends the inner fluid channel of the inserted pipette tip into the inner cavity of the pipette tip extension.

In an embodiment of the invention, which may be combined with any other of the embodiments which were or will be mentioned, unless there is a contradiction, the bottom and the exterior wall are formed as one piece. The pipette tip extension of this embodiment functions as a structurally stable cup-like attachment.

In an embodiment of the invention, which may be combined with any other of the embodiments which were or will be mentioned, unless there is a contradiction, the bottom and the exterior wall are configured as being impervious to fluids. In this embodiment it is ensured that for example a liquid which is moved between a pipette tip and the pipette tip extension is fully prohibited to move out of the fluid uptake area in the bottom region or on the side in the region of the exterior wall. Neither the bottom nor the exterior wall may provide for example a filtering function, for example for separating a liquid from a liquid-liquid or liquid-solid phase extraction or separation.

Suitable materials are for example a plastic polymer such as polypropylene, polyethylene, or a fluoroelastomer, or of glass or a metal such as aluminum or steel. A plastic has the advantage of being in addition relatively cheap concerning production costs, and being slightly deformable. This allows to attach the pipette tip extension for example in a friction fit manner to a pipette tip. It is also the preferred material for a disposable use. However, it is also possible to attach the pipette tip extension by means of form fit, e.g. by a tongue and groove connection. Another suitable material is polytetrafluoroethylene.

In an embodiment of the invention, which may be combined with any other of the embodiments which were or will be mentioned, unless there is a contradiction, the pipette tip extension may be of a chemically inert material, for example of a plastic polymer such as polypropylene, polyethylene, or a fluoroelastomer, or of glass or a metal such as aluminum or steel. A plastic has the advantage of being chemically inert, relatively cheap concerning production costs, and being slightly deformable. This allows to attach the pipette tip extension for example in a friction fit manner to a pipette tip. It is also the preferred material for a disposable use. However, it is also possible to attach the pipette tip extension by means of form fit, e.g. by a tongue and groove connection. Another suitable chemically inert material is polytetrafluoroethylene.

In an embodiment of the invention, which may be combined with any other of the embodiments which were or will be mentioned, unless there is a contradiction, the pipette tip extension comprises one or more distance elements which are arranged flush with respect to the proximal end of the pipette tip extension, for example up to the bottom, and/or the pipette tip extension comprises one or more distance elements which are arranged offset with respect to the proximal end of the pipette tip extension.

The length of the offset may for example be coupled or combined with one or more tapering steps in the exterior wall. The length might be adapted to the outer dimensions of the pipette tip which shall be inserted into the pipette tip extension.

In an embodiment of the invention, which may be combined with any other of the embodiments which were or will be mentioned, unless there is a contradiction, a distance element may for example be an inner bar, but also other types of protrusions at the inner side of the exterior wall of the pipette tip extension are possible, such as noses, as well as varying forms such as straight or snake- or wave-like bars. Combinations of protrusions of different types or forms are possible. Irregular forms are particularly suitable for providing an additional mixing effect to the liquid which is introduced into the pipette tip extension. It might be possible that only one inner distance element is provided at the inner side of the exterior wall, as long as it is suitable to allow the formation of a fluid uptake area in the inner cavity of the pipette tip extension. In the case only one distance element is used, the pipette tip hosting area may be acentric with respect to the medial axis of the pipette tip extension. A multitude of distance elements is also possible, which allows a more precise definition of the location of the pipette tip hosting area and the fluid uptake area within the inner cavity of the pipette tip extension. However, also the use of a multitude of distance elements allows an acentric positioning of a pipette tip within the inner cavity of the pipette tip extension. In particular by coordinating the depth of each distance element in dependence on the inner form of the pipette tip extension, it may be defined whether a pipette tip will be positioned within a pipette tip extension in a centric or acentric manner.

In an embodiment of the invention, which may be combined with any other of the embodiments which were or will be mentioned, unless there is a contradiction, at least one of the distance elements comprises a stop surface which is directed towards a medial axis of the pipette tip extension, i.e. radially facing towards a medial axis of the pipette tip extension. The stop surface can be abutted by a pipette tip when the pipette tip extension is attached to the pipette tip. The stop surface of a distance element is in the context of the present invention the contact point or contact surface which is abutted by a pipette tip when the pipette tip extension is attached to said pipette tip. The stop surface therefore marks the border at that specific position between the fluid uptake area and the pipette tip hosting area.

In an embodiment of the invention, which may be combined with any other of the embodiments which were or will be mentioned, unless there is a contradiction, the one or more distance elements at the inner side of the exterior wall extend in a direction from a proximal region of the pipette tip extension towards the bottom of the pipette tip extension. The distance elements are for example configured as inner bars of the same or varying width, and/or which are more elongated along the direction from the proximal to the distal end than they are wide, with the width being the dimension along a lateral direction. The use of at least two or more elongated distance elements is particularly suitable for a precise positioning of a pipette tip within the pipette tip extension. For example, a multitude of shorter distance elements, which are positioned for example in an irregular array in an alternating manner to each other and/or along the direction from the proximal end towards the distal end may be possible, a lower number of distance elements which are longer and arranged in a regular array at the inner side of the exterior wall, or a mixture thereof are possible. As an additional or alternative provision, it may be foreseen to provide for example an elastomeric plastic material onto the distance elements, which may be applied by a two component injection molding step, for enhancing the holding force of the pipette tip extension on the pipette tip.

In an embodiment of the invention, which may be combined with any other of the embodiments which were or will be mentioned, unless there is a contradiction, the distance elements extend essentially continuously from the proximal region of the pipette tip extension to the distal region of the pipette tip extension. Such an arrangement is particularly suitable for distance elements, which are for example configured as inner bars, and allows for example a simplification of the manufacturing process, e.g. in an injection molding process.

In an embodiment of the invention, which may be combined with any other of the embodiments which were or will be mentioned, unless there is a contradiction, the stop surfaces of several distance elements together form a common stop surface in the inner cavity which can be abutted by an inserted pipette tip, i.e. can be brought into alignment with an inserted pipette tip. The distance elements are in particular dimensioned so that the common stop surface approaches the medial axis towards the distal end of the pipette tip extension. The common stop surface contributes to the definition of the pipette tip hosting area and the boarder of the fluid uptake area, respectively.

In an embodiment of the invention, which may be combined with any other of the embodiments which were or will be mentioned, unless there is a contradiction, the stop surface of each distance element is essentially parallel to the inner side of the exterior wall. This is particularly advantageous when the exterior wall of the pipette tip extension is adapted in shape to the exterior wall of a pipette tip to be inserted, that is when both walls, namely the exterior wall of the pipette tip extension and the exterior wall of the pipette tip, are arranged parallel to each other when assembled.

It is for example particularly useful to adapt the number of distance elements and/or depth of each distance element to the outer dimensions of a pipette tip to which the pipette tip extension shall be attached to. This adaptation may be done for example in view of the outer dimensions of the pipette tip and/or in view of the intended friction between the inserted pipette tip and the pipette tip extension, depending on whether a tight friction fit is intended or only a loose insertion is intended. It may further be useful to adapt these parameters to the volume of liquid which shall be taken up in the fluid uptake area of the pipette tip extension. For example, the uptake volume of a pipette tip extension might correspond to the nominal volume of the pipette tip to which the pipette tip extension shall be attached.

In an embodiment of the invention, which may be combined with any other of the embodiments mentioned or to be mentioned, unless there is a contradiction, the pipette tip extension comprises at least two distance elements, preferably at least three distance elements.

In an embodiment of the invention, which may be combined with any other of the embodiments mentioned or to be mentioned, unless there is a contradiction, at least one, preferably each distance element is configured as elongated bar which extends along a direction from the proximal end towards the distal end of the pipette tip extension.

In an embodiment of the invention, which may be combined with any other of the embodiments which were or will be mentioned, unless there is a contradiction, the exterior wall has a shape which is adapted to an outer shape, i.e. the shape of the exterior wall, of a pipette tip to be inserted into the pipette tip extension. Adapted can inter alia mean that at least parts of the exterior wall of the pipette tip extension show a shape similar to the outer shape of a pipette tip but in a different dimension, preferably in a larger dimension. It may be possible that in particular the inner side of the exterior wall of the pipette tip extension is adapted in its shape to the outer shape of a pipette tip.

In an embodiment of the invention, which may be combined with any other of the embodiments which were or will be mentioned, unless there is a contradiction, the exterior wall of the pipette tip extension is a circumferential wall which tapers towards the lower end of the pipette tip extension. The exterior wall may define the form and the outer dimensions of the pipette tip extension, which may be for example an oblong hollow body, which tapers at least in parts conically, e.g. in the region of the distal end, or tapers completely. The pipette tip extension may further be of an axially symmetric form, although an axially asymmetric form is possible too. Exemplarily, a pipette tip extension of 30 mm length is suitable, when a 200 µl volume pipette tip of 60 mm length shall be used and a liquid volume of 100 µl shall be dispensed and/or aspirated. The exterior wall may taper over the total length, or may additionally comprise for example cylindrical sections, which are preferably located at the proximal end of the pipette tip extension.

In an embodiment of the invention, which may be combined with any other of the embodiments which were or will be mentioned, unless there is a contradiction, the reception aperture may have a circular cross section, in a plane orthogonally to the medial axis of the pipette tip extension, which is particularly suitable for inserting a pipette tip, although it might be possible that the reception aperture has a deviating cross-sectional shape.

In an embodiment of the invention, which may be combined with any other of the embodiments which were or will be mentioned, unless there is a contradiction, the inner diameter of the reception aperture of the pipette tip extension may be 6 mm, and the outer diameter of the tip of the pipette tip which shall enter the reception aperture may be about 1 mm. Such an extension is suitable for example when a disposable pipette tip is used having an outer diameter of approximately 5 mm which shall rest within the reception aperture of the pipette tip extension, or when a fixed tip is used having an outer diameter of approximately 4 mm. The space between the inner diameter of the reception aperture and/or the inner side of the exterior wall may be controlled by one or more distance elements.

In an embodiment of the invention, which may be combined with any other of the embodiments which were or will be mentioned, unless there is a contradiction, the pipette tip extension comprises a constriction element for controlling an insertion depth of a pipette tip within the pipette tip extension. The constriction element defines a gap height between a distal end of an inserted pipette tip and the distal end of the pipette tip extension. In particular, the constriction element establishes the gap between the distal end of the pipette tip and the bottom of the pipette tip extension.

The constriction element functions as a stopper element which is able to restrict the insertion depth of a pipette tip when the pipette tip extension is attached to said pipette tip. The constriction element shall in particular prevent that the distal end of a pipette tip, which is inserted, abuts the bottom of the pipette tip extension and thereby closes the outlet opening of the pipette tip. By restricting the insertion of a pipette tip to a defined depth within the inner cavity of the pipette tip extension according to the invention, a gap, or a corresponding gap height, is defined which is generated when a pipette tip is inserted until the insertion is stopped at the constriction element.

The gap height, which is e.g. generated when a pipette tip is inserted under a controlled manner with the aid of the constriction element, may for example be 0.1 mm to 1 mm. Depending on the intended application, the gap height might by more than 1 mm.

In the context of the present invention, the gap describes the space between the bottom of the pipette tip extension and the distal end of a pipette tip, which is generated when the pipette tip extension and the pipette tip are assembled. The gap serves as a fluid connection between the inner cavity of the pipette tip and the fluid uptake area of the pipette tip extension and is also a part of the fluid uptake area. Upon insertion of the pipette tip, a fluid flow between the inner cavities of the pipette tip and the pipette tip extension is possible. Depending on the inner geometry at the distal end of the pipette tip and the number, dimensions and position of the constriction element, the volume of liquid and the flow rate can be influenced. A higher flow rate would in particular maximize a mixing effect.

In an embodiment of the invention, which may be combined with any other of the embodiments which were or will be mentioned, unless there is a contradiction, the constriction element is formed by:
  a stop surface or a part thereof of the one or more distance elements which is directed towards a medial axis of the pipette tip extension, and/or
  one or more spacing blocks arranged at the bottom in the inner cavity of the pipette tip extension.

A constriction element may thus be formed for example one or more distance elements and/or by other parts.

When the constriction element is formed by the stop surface of the one or more distance elements, or parts thereof, the dimensions of the distance elements are adapted so that—when a pipette tip is inserted into the pipette tip extension—the pipette tip abuts the stop surfaces and comes to an end position within the inner cavity when the distal end of the pipette tip has not reached the bottom of the pipette tip extension. In this case, it is particularly the depth of the distance element that is defining how far the distance element protrudes into the inner cavity and which depth may be used to define the gap height.

When the constriction element is formed by one or more spacing blocks arranged at the bottom in the inner cavity of the pipette tip extension, a pipette tip abuts the upper surface of the one or more spacing blocks. The gap has in this case a gap height which corresponds to the height of the spacing block by which the spacing block protrudes into the inner cavity of the pipette tip extension along the longitudinal axis).

A spacing block may be configured as an independent structure connected to the bottom or being formed as a protrusion from the bottom. A spacing block may however also be formed by a distal end of a distance elements. In this case, the distal end of the distance element forms an additional protrusion towards the medial axis of the pipette tip which extends along the inner side of the bottom. In a further alternative embodiment, a spacing block may be formed by a protrusion of the exterior wall at the inner side, extending towards the medial axis of the pipette tip extension and along the inner side of the bottom.

A spacing block may comprise one or more additional positioning elements to better position the distal end of a pipette tip within the bottom region of the pipette tip extension.

Combinations of different embodiments of spacing blocks in one pipette tip extension may be possible as well as the use of similarly configured spacing blocks.

In an embodiment of the invention, which may be combined with any other of the embodiments which were or will be mentioned, unless there is a contradiction, the constriction element is formed by two or more spacing blocks arranged on the inner side of the bottom of the pipette tip extension. The spacing blocks are arranged on the inner side of the bottom in a random-like pattern or in a defined pattern, for example in a star-like pattern.

The use of a constriction element has the advantage that the insertion depth of a pipette tip within the pipette tip extension is controllable by a physical structure. The control of the insertion depth may ensure that the pipette tip leaves a gap below its distal end when positioned within the pipette tip extension. The gap allows the liquid being transported from the pipette tip over the gap into the fluid uptake area of the pipette tip extension. The gap functions as a fluid connection between the inner cavity of the pipette tip and the fluid uptake area of the pipette tip extension. In an advantageous embodiment, the distance element(s) and eventually present constriction element(s) is or are arranged in such a manner that a continuous fluid uptake area is generated along the inner side of the pipette tip extension, which means that preferably no isolated channels are generated but that each generated fluid uptake area is in fluid connection with the other fluid uptake areas. This ensures that the liquid which is moved between the pipette tip and the pipette tip extension and over the sample remains homogeneously.

Although the constriction element is not compulsory for a controlled insertion of a pipette tip into the pipette tip extension, as the insertion depth might be controlled alone by the used force for the insertion, a constriction element is an additional safeguard to ensure a repeatable gap height. As an additional or alternative provision, it may be foreseen to provide for example an elastomeric plastic material onto the constriction element, which may be applied by a two-component injection molding step, for enhancing the holding force of the pipette tip extension on the pipette tip.

Without a constriction element, the insertion of a pipette tip into a pipette tip extension may be controlled by control of the force used for the insertion. In the context of a liquid handling workstation, the required forced may for example be controlled by a current limitation used for the movement of the pipetting channel to which the pipette tip extension is associated. The required force may be dependent from the dimensions of the pipette tip, the dimensions of the pipette tip extension which shall be attached to the pipette tip, but also for example by the material of the pipette tip and pipette tip extension, for example by their hardness or elasticity.

In an embodiment of the invention, which may be combined with any other of the embodiments which were or will be mentioned, unless there is a contradiction, the pipette tip extension is configured as being ejectable from a pipette tip by an ejection mechanism of a liquid handling workstation. The ejection mechanism may for example be a passive mechanism of for example a rake-like structure, or a passive mechanism.

By use of a passive mechanism, typically a pipette tip or in this case a pipette tip extension may be removed by moving the corresponding pipetting channel and thereby moving the pipette tip extension against the tines of the rake, while the ejection mechanism is stationary. By use of an active mechanism, the ejection mechanism itself is moved in relation to the pipette tip extension, and thereby actively removes the pipette tip extension from the pipette tip. The frictional connection in this case between a pipette and a disposable pipette tip is advantageously greater than the frictional connection between the disposable pipette tip and the attached pipette tip extension.

The features of the above-mentioned embodiments of the pipette tip extension can be used in any combination, unless they contradict each other.

Another aspect of the invention concerns an assembly comprising a pipette tip for aspirating and/or dispensing a liquid, a pipette tip extension attached to the pipette tip, and one or more distance elements for spacing apart the pipette tip from the attached pipette tip extension. The pipette tip extension comprises a proximal end, a distal end, and an exterior wall extending between the proximal end and the distal end. The exterior wall has an outer side and an inner side and forms at the proximal end a reception aperture for inserting the pipette tip. The pipette tip extension further comprises a bottom at the distal end, an inner cavity enclosed by the inner side of the exterior wall and the bottom. The one or more distance elements are dimensioned to establish a fluid uptake area adjacent to the inner side of the exterior wall, the bottom, and the inserted pipette tip. The fluid uptake area extends from the bottom up to the reception aperture and is in fluid connection with the surrounding atmosphere at the reception aperture.

The pipette tip extension may comprise one or more features as described above in the context of the single pipette tip extension. These features and/or different embodiments can be used in any combination unless they contradict each other. The definitions given to the pipette tip extension above apply also to the pipette tip extension being part of the assembly.

Another aspect of the invention concerns a method of treating a sample in a liquid. The method comprises the following steps: Providing a pipette tip extension in an embodiment as discussed above. A liquid is aspirated into a pipette tip. The pipette tip filled with the liquid is inserted into the pipette tip extension. The liquid is dispensed into the fluid uptake area of the pipette tip extension. It is possible to dispense the complete volume of liquid into the pipette tip extension or only a partial volume. Optionally, the liquid is moved one or multiple times between the pipette tip and the fluid uptake area of the pipette tip extension. This is advantageous in such cases where an additional mixing effect for example shall be achieved, for example.

The pipette tip for carrying out the method as described herein or in embodiments as described in the following, may be a commonly available disposable pipette tip, or alternatively a so-called fixed tip as described above.

In an embodiment of the invention, which may be combined with any other of the embodiments which were or will be mentioned, unless there is a contradiction, the pipette tip extension is moved by moving the pipette tip inserted into the pipette tip, using a handheld pipette or a pipette of a liquid handling workstation.

A handheld pipette (or also called pipettor) is configured for the manual or at least semi-automatic use by a laboratory staff. A manual use may have the advantage that the method may be carried out with method steps which are individually chosen and adapted to the actual situation.

Performing the method automatically by use of a liquid handling workstation has the advantage that a high number of samples may be treated in an accurate way with consistent quality and specificity. Liquid handling workstations are typically under the control of one or more controller, which control for example a pipetting robot, the liquids used, steps of aspirating, dispensing, mixing or other pipetting steps by a pipetting head, movements of pipettes, containers, etc.

In an embodiment of the invention, which may be combined with any other of the embodiments which were or will be mentioned, unless there is a contradiction, each step of aspirating, dispensing or moving the liquid is controlled by a liquid handling workstation, the liquid handling workstation comprising a pipette to which the pipette tip is attached.

In an embodiment of the invention, which may be combined with any other of the embodiments which were or will be mentioned, unless there is a contradiction, the liquid comprises a sample.

In an embodiment of the invention, which may be combined with any other of the embodiments which were or will be mentioned, unless there is a contradiction, the sample is a nucleic acid, a protein, components comprising a carbohydrate, a fatty acid, a vitamin, and/or a hormone, or other cellular components.

The sample may for example be available in an isolated form, or the sample is still present within a cell. A cell may be any prokaryotic or eukaryotic cell which content shall be subjected to an analysis. The cell may be for example a bacterial cell, including an archaebacterial cell. Exemplarily, a bacterial cell may be an *Escherichia coli* cell or other cells involved in standard laboratory assays, or other bacterial cells for example involved in a disease. A cell may also be a fungal cell, for example a *Saccharomyces Cerevisiae* cell. The cell may also be a cell derived from another eukaryotic organism, for example of a plant, an animal or a human.

The cell may also be a part of a cell culture, which is a culture of a cell or a cell population in or on a culture medium or nutrient solution outside of the organism. The cell culture medium is adapted to the requirements of the cell to be cultured and to the requirements of the assay. For example, a bacterial cell may be cultured a semi-solid or solid cell culture medium in form of a so-called agar plate. It is also known to culture cells in a liquid culture medium, which is typically used for animal or human cell culture. Cells of a cell culture may be primary cells (directly generated from an organism) or a cell line (immortalized cells).

In an embodiment of the invention, which may be combined with any other of the embodiments which were or will be mentioned, unless there is a contradiction, either the sample is bound to magnetic beads in the liquid, or magnetic beads, which are configured to allow binding of the sample, are provided in the inner cavity of the pipette tip extension before or after the dispense of the liquid comprising the sample into the pipette tip extension.

In the case where the sample is bound to magnetic beads which are present in the liquid, the sample has for example previously been isolated. In the case where the sample is not yet isolated from a cell, it is possible to first carry out a cell lysis step in the pipette tip extension, and afterwards add magnetic beads which are configured to bind to the desired cellular compound, into the pipette tip extension. A cell lysis may be carried out for example by heat or enzymatically.

In an embodiment of the invention, which may be combined with any other of the embodiments which were or will be mentioned, unless there is a contradiction, the pipette tip extension comprising the liquid with the sample and the magnetic beads is moved by moving the inserted pipette tip using a handheld pipette or a pipette of a liquid handling workstation, to which the inserted pipette tip is attached.

In an embodiment of the invention, which may be combined with any other of the embodiments which were or will be mentioned, unless there is a contradiction, the pipette tip extension is moved to a magnet of a magnetic bead separation device and brought into a magnetizing position, where the magnetic beads are allowed being separated from the liquid at a defined position within the fluid uptake area of the pipette tip extension. Separation is usually achieved in that the magnetic beads are harvested close to the magnets in a pellet-like formation.

In an embodiment of the invention, which may be combined with any other of the embodiments which were or will be mentioned, unless there is a contradiction, after the magnetic bead separation, a washing step is carried out, involving the steps of:
aspirating the liquid from the pipette tip extension into the pipette tip, and removing the pipette tip from the pipette tip extension,
inserting a pipette tip comprising a washing solution into the pipette tip extension,
moving the pipette tip extension to a working position and dispensing the washing solution into the fluid uptake area of the pipette tip extension to the separated magnetic beads,
optionally aspirating and dispensing the washing solution one or more times.

In an embodiment of the invention, which may be combined with any other of the embodiments which were or will be mentioned, unless there is a contradiction, after the magnetic bead separation, an elution step is carried out, involving the steps of:
aspirating a liquid from the pipette tip extension into the pipette tip, and removing the pipette tip from the pipette tip extension,
inserting a pipette tip comprising an elution solution into the pipette tip extension,
moving the pipette tip extension to a working position and dispensing the elution solution into the fluid uptake area of the pipette tip extension with the separated magnetic beads,
optionally aspirating and dispensing the elution solution one or more times, thereby separating the sample from the magnetic beads,
moving the pipette tip extension to the magnetizing position, where the magnetic beads are allowed being separated from the elution solution at a defined position within the fluid uptake area of the pipette tip extension, and
aspirating the elution solution from the pipette tip extension into the inserted pipette tip, removing the pipette tip from the pipette tip extension, and dispensing the elution solution into a target vessel.

In an embodiment of the invention, which may be combined with any other of the embodiments which were or will be mentioned, unless there is a contradiction, an elution step is carried out, involving the steps of:
aspirating a liquid from the pipette tip extension into the pipette tip, and removing the pipette tip from the pipette tip extension,
inserting a pipette tip comprising a solvent solution into the pipette tip extension,
moving the pipette tip extension to a heating device and dispensing the solvent solution into the fluid uptake area of the pipette tip extension with the separated magnetic beads, optionally aspirating and dispensing the solvent solution for mixing the magnetic beads with the solvent solution,
heating the pipette tip extension comprising the solvent solution and the magnetic beads bound to the sample, thereby causing a detachment of the sample from the magnetic beads and dissolving the sample in the solvent solution;
moving the pipette tip extension to the magnetizing position of the magnetic bead separation device and allow the magnetic beads from being separated from the solvent solution at a defined position within the fluid uptake area of the pipette tip extension,
aspirating the solvent solution from the pipette tip extension into the inserted pipette tip, removing the pipette tip from the pipette tip extension, and dispensing the solvent solution comprising the sample into a target vessel.

In an embodiment of the invention, which may be combined with any other of the embodiments which were or will be mentioned, unless there is a contradiction, the method further comprises the step of removing the pipette tip from the pipette tip extension by using an ejection mechanism of a liquid handling workstation.

The features of the above-mentioned embodiments of the method can be used in any combination as it is reasonable for a skilled person, unless they contradict each other.

The invention additionally relates to the use of a pipette tip extension as described herein in the manufacture of a treated liquid according to a method as described herein, and to the production of a test result based on a method carried out as described herein.

BRIEF DESCRIPTION OF THE DRAWINGS

Embodiments of the current invention are described in more detail in the following with reference to the Figures (Fig.). These are for illustrative purposes only and are not to be construed as limiting. It shows FIG. 1A a schematic side view of a pipette tip extension in a first embodiment, FIG. 1B a schematic view onto the proximal end of the pipette tip extension of FIG. 1A, FIG. 1C a schematic sectional drawing of the pipette tip extension of FIG. 1A according to the intersection plane C-C as indicated in FIG. 1B, FIG. 1D a schematic sectional drawing of the pipette tip extension of FIG. 1A according to the intersection plane D-D indicated in FIG. 1B, FIG. 2A a schematic side view of an assembly comprising the pipette tip extension of FIG. 1A and an inserted pipette tip, FIG. 2B a schematic sectional drawing of the assembly of FIG. 2A, FIG. 3 a schematic overview drawing of a pipette tip extension in a further embodiment functionally integrated into a liquid handling workstation, FIG. 4A a schematic view of a selected embodiment of a distance element at the inner side of the exterior wall, FIG. 4B schematic views of various embodiments of distance elements at the inner side of the exterior wall, FIG. 5A a schematic perspective side view onto a pipette tip extension in a second embodiment, FIG. 5B a schematic and perspective longitudinal section of the pipette tip extension of FIG. 5A, FIG. 5C a schematic and perspective view of a cutaway-cross-section of the bottom region of the pipette tip extension of FIG. 5A, FIG. 6A a schematic perspective side view onto a pipette tip extension in a third embodiment, FIG. 6B a schematic and perspective longitudinal section of the pipette tip extension of FIG. 6A, FIG. 6C a schematic and perspective view of a cutaway-cross-section of the bottom region of the pipette tip extension of FIG. 6A, FIG. 7 a simplified schematic cross sectional view of the bottom of the pipette tip extension in the third embodiment with an inserted pipette tip, FIG. 8 a schematic overview of possible method steps which can be carried out with a pipette tip extension, and FIG. 9 a schematic top view onto a magnetic bead separation device comprising a downholder mechanism for handling a pipette tip extension.

DETAILED DESCRIPTION OF THE INVENTION

Figure 1A:
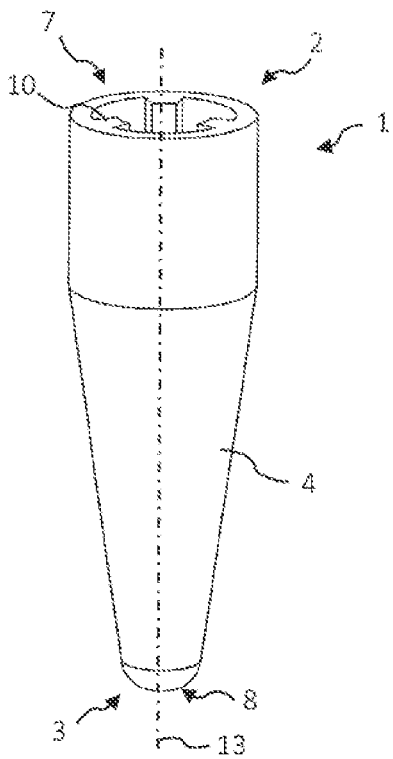

FIG. 1A shows an exemplary embodiment of pipette tip extension 1 in a schematic side view. The pipette tip extension 1 here is an elongated, tube-like body with a proximal end 2 and a distal end 3. An exterior wall 4 extends between the proximal end 2 and the distal end 3, and forms said reception aperture 7 of the pipette tip extension 1. A bottom 8, which is connected to the exterior wall 4, closes the pipette tip extension 1 at the distal end 3. The exterior wall 4 and the bottom 8 enclose an inner cavity 9, more precisely the inner side 6 of the exterior wall 4 and the inner side of the bottom 8. The pipette tip extension 1 shown here is a rotationally symmetric body and further comprises three distance elements 10, which are configured as elongated bars and which are mounted flush with the proximal end 2, so that the proximal end of the exterior wall 4 and each proximal end of the distance elements form a common surface. The medial axis 13 is indicated, and corresponds here to the longitudinal axis of the pipette tip extension 1.

Along the longitudinal axis, the pipette tip extension 1 comprises three different sections: a more proximal section formed as an essentially cylindrical tube, followed by a section which tapers conically towards the bottom 8; the third section is the bottom 8. This embodiment shows one possibility to adapt the shape of the pipette tip extension 1 to the shape of a pipette tip 14 which is to be inserted into the pipette tip extension 1. In the present context, the term "a pipette tip extension 1 attachable/attached to a pipette tip 14" describes essentially the same situation as the term "a pipette tip 14 insertable/inserted into a pipette tip extension 1". Other adaptations of the shape and dimension of the pipette tip extension 1 are possible, as shown exemplarily in the FIGS. 5A-C and 6A-C. Such adaptations are not restricted to the choice of the shape of the exterior wall 4. For example, the shape and/or dimensions of one or more of the distance elements 10 may be used to configure the pipette tip extension 1 as being attachable to a pipette tip 14.

Figure 1B:
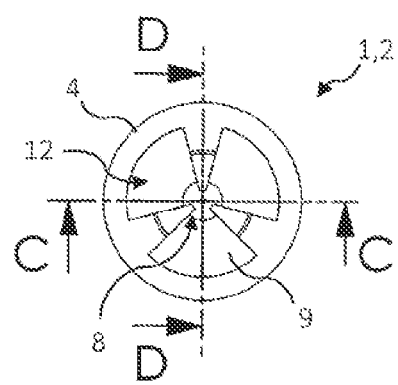

FIG. 1B shows a schematic view onto the proximal end of the pipette tip extension 1. The proximal surface is formed here commonly by the proximal end of the exterior wall 4 and the proximal end of the distance elements 10. The three distance elements 10 are formed by the exterior wall 4 and protrude into the inner cavity 9. A pipette tip 14 which is inserted into the inner cavity 9 abuts the distance elements 10 so that the pipette tip 14 does not touch the inner side of the exterior wall 4 (see also FIGS. 2A and 2B). The distance element 10 or distance elements 10 therefore establish a fluid uptake area 12 which is essentially adjacent to the inner side 6 of the exterior wall 4 and within the inner cavity 9. The dimensions of the distance elements 10 may influence the volume of the fluid uptake area 12.

Figure 1C:
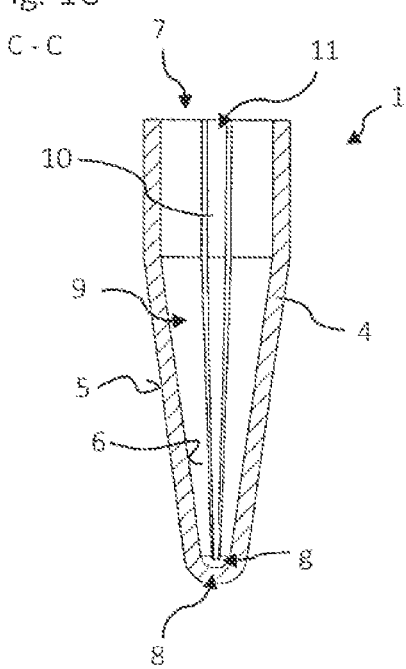
Figure 1D:
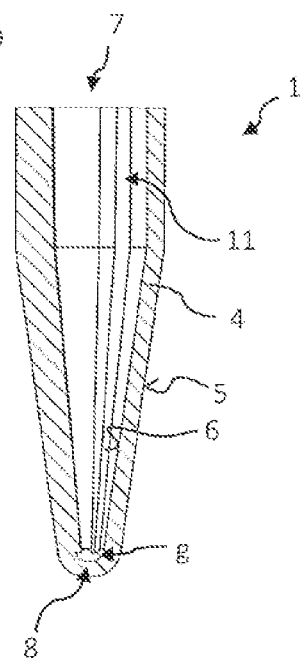

In FIG. 1B, the course of two intersection planes C-C and D-D are indicated, on which the FIGS. 1C and 1D are based on:

In FIG. 1C, a schematic sectional view of the pipette tip extension 1 according to the intersection plane C-C is shown. The pipette tip extension 1 of FIG. 1A can be seen here in a longitudinal section, which particularly allows a view onto one of the distance elements 10 which is configures as an elongated distance bar, and also a view onto the bottom 8 of the pipette tip extension 1. As can be seen, the bottom 8 restricts the inner cavity 9 at the distal end 3 of the pipette tip extension 1. The bottom 8 and the exterior wall 4 lead seamlessly into one another and commonly form the inner side of the pipette tip extension 1. The distance bar 10 reaches not up to the bottom 8 but leaves a gap g towards the bottom 8 in this case. In the embodiment shown, the distance bar(s) ensures that a pipette tip 14 which is inserted into the pipette tip extension 1 does not abut the bottom 8 but that a gap g of a gap height h is generated. In this way a continuous fluid flow between the inserted pipette tip 14 and the inner cavity 9 of the pipette tip extension 1 is established.

The distance bar 10 has a stop surface 11, which can be seen frontally. In this longitudinal section, the distance bar 10 and its stop surface 11 extends essentially parallel to the exterior wall. This may allow an easy handling during the manufacturing process such as an injection molding process. A pipette tip 14 which is inserted abuts the stop surface of the distance bar, so that the insertion depth is controlled.

In FIG. 1D, a schematic sectional section of the pipette tip extension according to the intersection plane D-D indicated in FIG. 1B is shown. This section allows a view of the pipette tip extension of FIG. 1A in a longitudinal section, with a frontal view of one of the bars being cut (left side) and one of the bars shown in a side view. The gap g formed between the distal end of the cut distance bar on the left side and the inner side of the bottom 8 can be seen.

It can further be seen that the two visible distance bars extend continuously from the proximal end 2 towards the distal end 3, ending with an offset towards the distal end 3. The surface of each elongated bar which faces towards the medial axis 13 function as a stop surface 11 for the inserted pipette tip 14; all stop surfaces together form a "common" stop surface in this case which define the position of the pipette tip 14 within the pipette tip extension 1. The pipette tip extension 1 in this embodiment is a single-piece body with respect to the exterior wall 4, the bottom 8, and the distance elements 10.

In FIG. 2A an assembly comprising a pipette tip extension 1 with an inserted pipette tip 14 can be seen in a schematic side view. The pipette tip 14 shown is in a typical disposable pipette tip for handling liquids e.g. with a handheld pipette or a with a pipette 23 of an automated liquid handling workstation 20. Such a pipette tip 14 is an elongated tube having different cylindrical or conically tapering wall sections of a circumferential wall 15, which may be adapted to particular technical requirements of a pipette 23 and/or a pipetting head 21 to which the pipette tip 14 shall be attached for pipetting. The pipette tip 14 shown here comprises at the proximal end a collar 16 with strengthening struts and at the distal end an outlet opening 17 for dispensing or aspirating a liquid (see here FIG. 7). The pipette tip 14 is attached to a pipette 23 with the proximal end, and the collar 16 prevents a deformation of the pipette tip 14 during attachment to the pipette 23, and provides a stabilizing effect.

In FIG. 2A, the pipette tip 14 is inserted with the outlet opening 17 ahead into a pipette tip extension 1 which essentially corresponds to the pipette tip extension shown in FIG. 1A. The distance elements 10 are configured here as elongated bars which form the fluid uptake area 12 adjacent to the inner side 6 of the exterior wall 4, and which additionally control the insertion depth of the pipette tip 14 in a way to ensure the formation of a gap g between the distal end of the pipette tip 14 and the bottom 8 of the pipette tip extension 1.

The gap g which is formed after insertion of the pipette tip 14 can be seen in the sectional view of FIG. 2B. FIG. 2B is a schematic sectional drawing of the assembly of FIG. 2A along the intersection plane A-A, and in this Figure it becomes also apparent that the gap g at the bottom 8 of the pipette tip extension 1 in this embodiment provides a fluid connection between the interior of the disposable pipette tip 14 and the fluid uptake area 12 in the inner cavity 9 of the pipette tip extension 1. An analogous situation can be seen in FIG. 7. As the fluid uptake area 12 is additionally in fluid connection with the surrounding atmosphere at the proximal end 2 of the pipette tip extension 1, it is ensured that a liquid 20 may be moved between the interior 18 of the pipette tip 14 and the fluid uptake area 12 of the pipette tip extension 1 when they are assembled to a functional unit. It is an advantage of the formation of the gap g that for example when a mixing step is carried out in the pipette tip extension 1, relatively high flow velocities may be achieved, thereby increasing the efficiency of the mixing.

Figure 3:
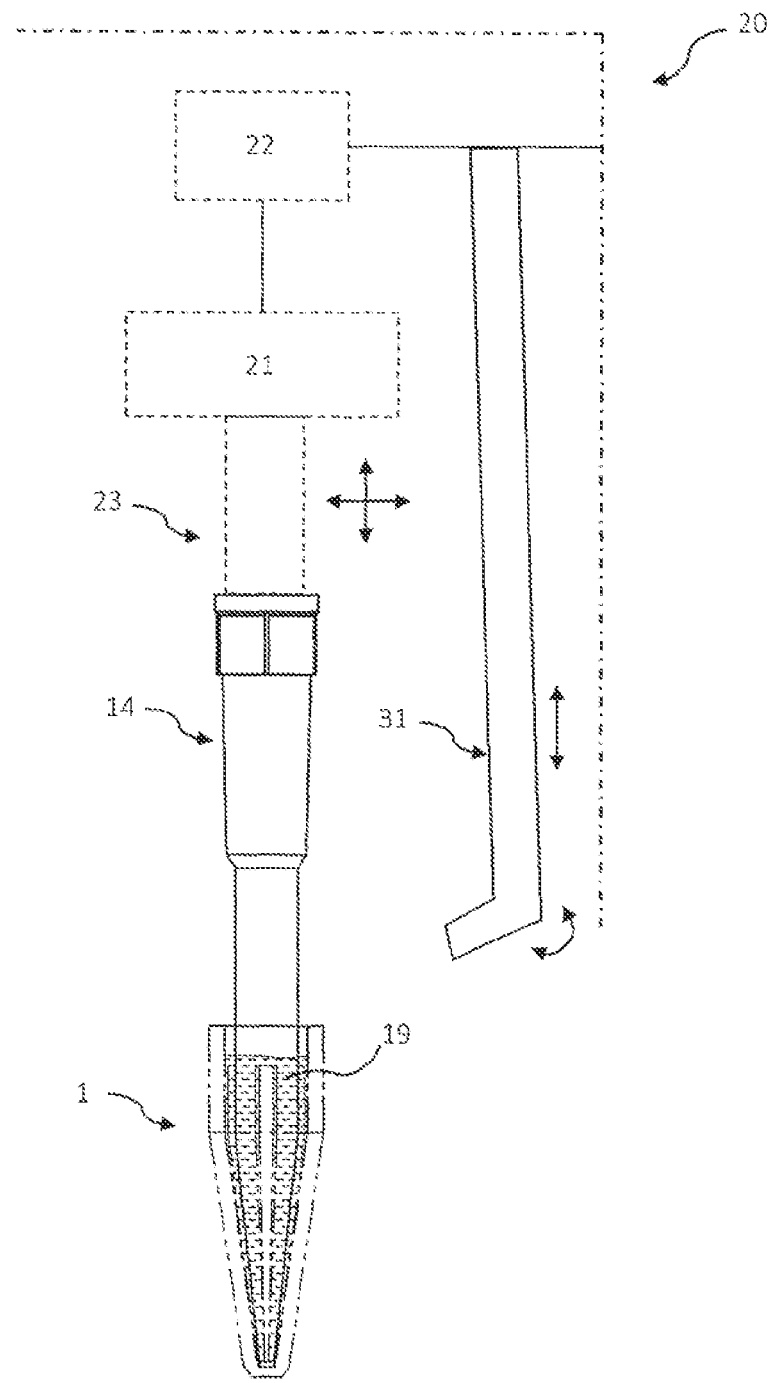

In FIG. 3, a pipette tip extension 1 is shown in a schematic overview during a liquid handling process of a liquid handling workstation 20. The liquid handling workstation 20 is configured to handle liquids 19 in an automated manner under the control of a controller 22. In particular, the controller 22 controls the activity for example of a pipetting head 21 for aspirating and dispensing liquids and moving liquids. In FIG. 3, the pipette tip extension 1 is shown as being attached to disposable pipette tip 14 which in turn is attached to a pipette 23 of a pipetting head 21. A liquid 19 is present in the fluid uptake area 12 of the pipette tip extension 1, for example by dispensing from the pipette tip 14, though it might also be possible that the liquid 19 has been dispensed before and the pipette tip 14 shown is simply inserted into the pipette tip extension 1 including the liquid 19 afterwards, for example for aspiration and/or moving the pipette tip extension 1 to another place. After insertion of a pipette tip 14, the pipette tip extension 1 is movable under the control of the liquid handling workstation 20. The possible movements are indicated by the arrows. The functional connection between the liquid handling workstation 20, the controller 22, and the pipetting head 12 are indicated by connection lines.

The liquid handling workstation 20 may additionally be configured to provide a mechanism of removing a pipette tip extension 1 from a pipette tip 14 to which it is attached. Such a mechanism may be for example an existing ejection mechanism 31 of a liquid handling workstation 20 used for removing a disposable tip 14 from a pipetting head 21, or may be a separate mechanism, like a rake as discussed above.

FIG. 4A shows in a schematic view onto the inner side 6 of the exterior wall 4 an exemplary embodiment of a distance element 10 which is configured as an elongated bar, and which is arranged flush with the proximal end of the exterior wall 4 of a pipette tip extension 1. The elongated bar extends from the proximal end 2 towards the distal end 3, and has a width "a" which corresponds to its dimension along the perimeter of the inner side 6 of the exterior wall 4, it has a length "b" which corresponds to its longitudinal dimension, and it has a depth "c" which corresponds to its dimension by which it protrudes into the inner cavity 7 and towards a medial axis 13. The description of depth a, length b, and width c may be applied to the distance elements 10 also in general.

FIG. 4B shows schematically different configurations of a distance element 10. All distance elements 10 shown are arranged with an offset to the proximal end 2 of the peripheral wall 4. Shown are distance elements 10 which are configured as more or less elongated bars, or as cylindrical protrusions. It is possible to combine differently configured distance elements 10 to achieve a desired seat of a specific pipette tip 14 within the pipette tip extension 1. For example, a multitude of elongated bars may be arranged along the same line from the proximal end 2 towards the distal end 3. Such a distribution may particularly be advantageous for achieving a mixing effect within the pipette tip extension 1. Apart from simple elongated dimensions, also deviating forms such as snake- or nose-like extensions or other may be possible.

At the more distal section, additional constriction elements 24 for controlling the insertion depth of a pipette tip 14 are shown. On the left side, a distance bar is shown which comprises an additional protrusion towards the inner cavity 7 at its distal end. This additional protrusion sits on the side of the bottom 8 which faces towards the inner cavity 9. On the right side, a single constriction element 24 is shown which is a simple protrusion directly from the inner side 6 of the exterior wall 4, and which may equally provide a stopper or stop surface that can be abutted from the distal end of a pipette tip 14.

The geometry of the inner gap which corresponds the fluid uptake area 31 may be adjusted by a respective adjustment of the number and geometry of the distance element(s) 10 used and also the geometry of the shape of the exterior wall 4, and, if desired, by the use of additional constriction elements 24. It might for example particularly desirable to minimize the width 29 of the fluid uptake area 12 when only smaller volumes of liquid 19 shall be used; in this case, special emphasis is needed for the geometry of the distance element(s) to minimize potential fluid trapping effects.

Figure 5A:
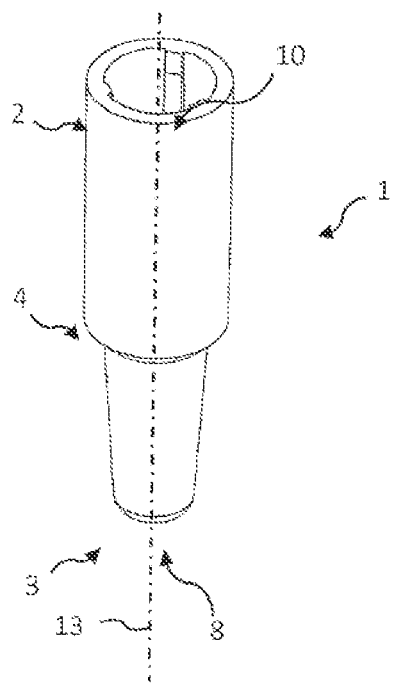

In FIG. 5A a schematic side view of a pipette tip extension 1 in a second embodiment concerning the configuration of the exterior wall 4, distance elements 10, and constriction elements 24 is shown. The pipette tip extension 1 comprises along the medial axis 13 two different sections, an upper section towards the proximal end 2, and a lower section towards the distal end 3. The upper section is longer than the lower section in this embodiment and is configured as an essentially cylindrical tube or as a tube only slightly tapering towards the lower section. The lower section is configured as a hollow tube with a higher degree of tapering towards the bottom 8. The lower section mouths into the bottom 8 at the distal end 3 of the pipette tip extension 1, which is more clearly visible in the FIGS. 5B and 5C. The upper section has a larger diameter than the lower section, so that a shoulder is formed at the transition from the upper section to the lower section. In this embodiment, the shoulder is formed both, on the outer side 5 and on the inner side 6 of the exterior wall 4.

The pipette tip extension 1 comprises at the upper section and on the inner side 6 of the exterior wall 4 three distance elements 10 which are configured as elongated bars. These elongated bars are flush with the proximal end 2 and extend continuously on the inner side 6 of the exterior wall 4 up to the shoulder at the transition to the lower section. The elongated bars protrude to a lesser extends into the inner cavity 9 at the immediate proximal end 2 of the pipette tip extension that close to the transition to the lower section. By this, the elongated bars, and specifically their surface which faces towards the medial axis 13, in the present context also referred to as stop surface 11, form in the inner cavity 9 a reception for a pipette tip 14, the reception tapering from the proximal end 2 of the pipette tip extension 1 towards the distal end 3. In this configuration, the pipette tip extension 1 is particularly useful for being attached to a pipette tip 14 which tapers in a complimentary way.

Figure 5B:
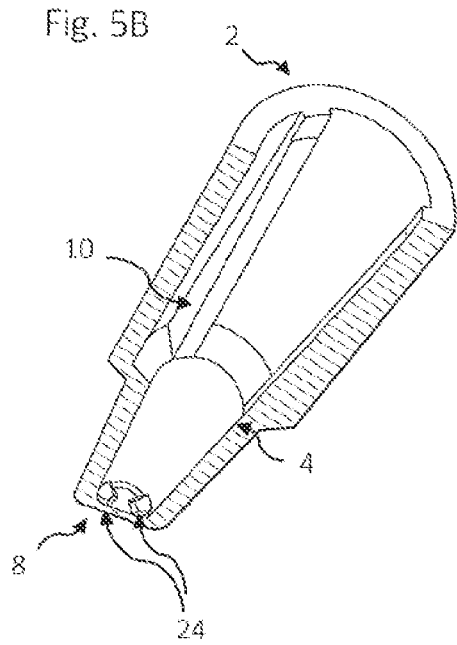

The configuration of the distance elements 10 as described for this second embodiment can be seen in more detail in FIG. 5B, which is a schematic and perspective longitudinal section of the pipette tip extension of FIG. 5A, thereby allowing a view into the inner cavity 9. By this it can be seen that at the transition from the upper section to the lower section, the elongated bars merge with the exterior wall 4 at the lower section. In any case, the inner side 6 of the pipette tip extension 1 is configured in such a way that if a pipette tip 14 is inserted into the pipette tip extension 1 of the FIGS. 5A to 5C, said pipette tip 14 essentially only abuts the elongated distance bars but not the inner surface of the exterior wall 4 at the lower section. This is essential as it ensures that a fluid uptake area is formed at the inner side of the exterior wall 4 continuously from the bottom 8 up to the proximal end 2 of the pipette tip extension 1. Indeed, the configuration of the distance elements 10 define the positioning of a pipette tip 14 within the inner cavity 9 of the pipette tip extension 1, and ensure the formation of the fluid uptake area 12.

The pipette tip extension 1 shown here comprises in addition to the distance elements 10 three constriction elements 24 which are arranged at the bottom 8. These additional constriction elements 24 are configured here as separate spacing blocks which restrict at the bottom 8 the insertion depth of a pipette tip 14 within the pipette tip extension 1. A pipette tip 14 inserted into the pipette tip extension 1 abuts the upper side of each of the spacing blocks. A direct contact of the distal end of the pipette tip 14 with the bottom 8 of the pipette tip extension 1 is prevented, and at the same time it is ensured that a fluid connection is established between the inner cavity of the inserted pipette tip 14 and the fluid uptake area 12 of the pipette tip extension 1 by the formation of the gap g.

Figure 5C:
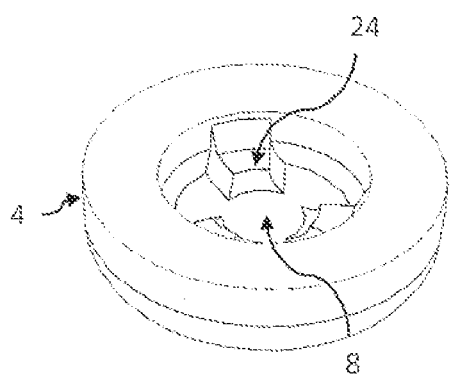

These additional spacing blocks are shown in more detail in FIG. 5C. It may be seen that in this embodiment the spacing blocks are positioned on the bottom 8 at the side which faces the inner cavity 9 and are connected with the inner side of the exterior wall 4. The connection with the exterior wall 4 is established by a bevelled section of the spacing block. The degree of inclination of this bevelled section may be used as a tool to precisely position a pipette tip 14 within the inner cavity 9, to ensure the establishment of a fluid uptake area 12 and the fluid connection between the fluid uptake area 12 and the inner cavity of the inserted pipette tip 14.

Figure 6A:
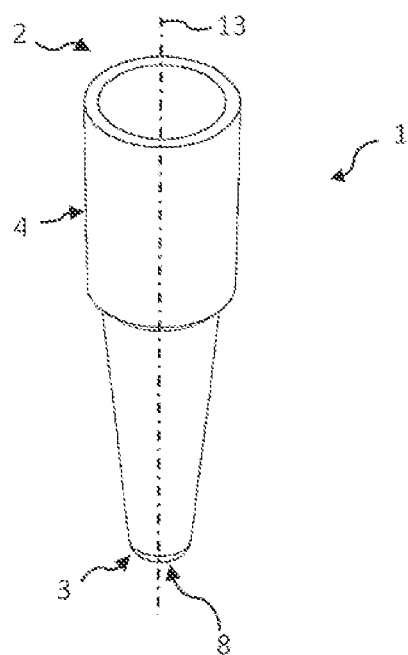

In FIG. 6A a schematic side view of a pipette tip extension 1 in a third embodiment concerning the configuration of the exterior wall 4, distance elements 10 and constriction elements 24 is shown. Also in this embodiment, the pipette tip extension 1 comprises along the medial axis 13 two different sections, an upper section towards the proximal end 2, and a lower section towards the distal end 3. The upper section has a larger diameter than the lower section, so that a shoulder is formed at the transition from the upper section to the lower section. Also in this embodiment, the shoulder is formed both, on the outer side 5 and on the inner side 6 of the exterior wall 4. Also similar is that the upper section is an essentially cylindrical tube or as a tube only slightly tapering towards the lower section, and the lower section being also configured as a hollow tube with a higher degree of tapering towards the bottom 8. The lower section mouths into the bottom 8 at the distal end 3 of the pipette tip extension 1.

However, in this third embodiment, the upper section is shorter than the lower section, and the distance elements 10 are arranged at the inner side 6 of the lower section. The inner cavity 9 surrounded by the upper section here rather serves to provide space for the fluid uptake area at the height of the upper section, and to provide the fluid connection with the surrounding atmosphere.

Figure 6B:
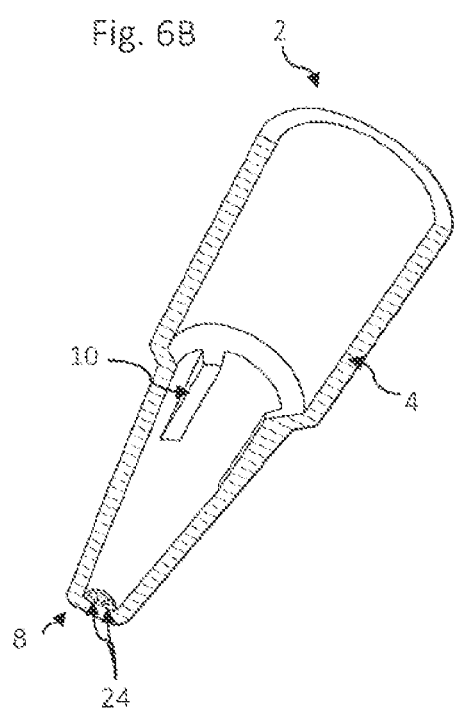
Figure 6C:
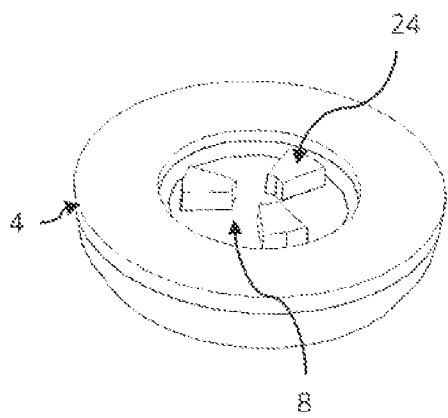

The configuration of the distance elements 10 in this third embodiment and the configuration of the constriction elements 24 for further restricting the insertion depth of a pipette tip 14 can be taken from the FIG. 6B and FIG. 6C. Also in this embodiment, three distance elements 10, configured as elongated bars, are used for establishing the fluid uptake area 12. Each of the three bars are formed by protrusions of the exterior wall 4, beginning flush with the shoulder formed between the upper and the lower section, and extending towards the bottom 8. The elongated bars are wedge-shaped and taper towards the distal end 3 of the pipette tip extension 1. The angle of inclination of the elongated bars may be adapted to the outer shape of the pipette tip 14 which shall be inserted, with the provision that the distance elements 10 space the pipette tip 14 apart from the inner side 6 of the exterior wall 4 to establish the fluid uptake area 12.

As may be seen in particular in FIG. 6C, the position of a pipette tip 14 within the inner cavity 9 is further controlled also in this embodiment by the use of additional constriction elements 24 at the bottom 8 of the pipette tip extension 1. In total, three constriction elements 24 are used, each being configured as spacing block. In contrast to the embodiment shown in the FIGS. 5A to 5C, the spacing blocks are here not further connected to the exterior wall 4. In this configuration, the spacing blocks do not separate the fluid uptake area 12 at the bottom area, as it is for example the case in the embodiment shown in FIGS. 5A to 5C. This configuration may have the advantage to further increase a mixing effect due to the introduction of additional flow turbulences, but may additionally introduce a risk of an increased dead volume. As can be taken from the FIGS. 5A-5D and 6A-6D, the choice of number and configuration of a constriction element 24 may additionally have an effect onto the fluid flow in an assembly of a pipette tip extension 1 and a pipette tip 14.

Figure 7:
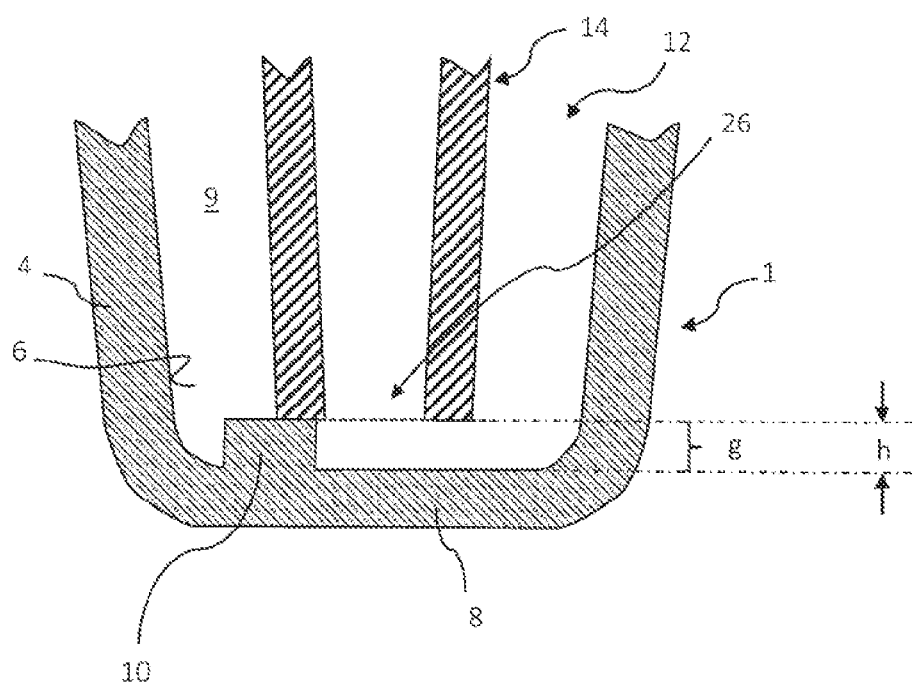

In FIG. 7, the configuration of the spacing blocks used on the bottom 8 of the third embodiment shown in FIG. 6C is shown in a more simplified schematic sectional view in higher magnification. The one spacing block which can be seen, is formed as a one-piece together with the bottom 8 and the exterior wall 4. Here, a pipette tip 14 is shown to be already inserted, abutting the upper surface of the one spacing block shown. The spacing block shown restricts the insertion depth of the pipette tip 14, and establishes a gap g between the distal end of the pipette tip 14 and the bottom 8 of the pipette tip extension 1. The gap g has a gap height h which in this case corresponds to the height of the spacing block along the longitudinal extension of the pipette tip extension 1 where the pipette tip 14 abuts the spacing block. The gap g formed at the bottom 8 of the pipette tip extension 1 allows a fluid being moved between the inner cavity of the inserted pipette tip 14 and the fluid uptake area 12 in the pipette tip extension 1. As the fluid uptake area 12 is not restricted towards the surrounding atmosphere at the proximal end 2 of the pipette tip extension 1, the fluid may be moved between pipette tip 14 and pipette tip extension 1 under the same conditions as for example for other standard aspiration or dispensing steps.

A particular advantage of a pipette tip extension 1 in one of the embodiments described herein or in an embodiment of a different combination of the single elements described or their equivalents is the possibility to simply put on the pipette tip extension 1 onto a pipette tip 14 and to move the pipette tip extension 1 with or without a liquid 19 by means of the pipette which holds the pipette tip 14. This is a particular advantage for example in the context of a liquid handling workstation 20, which is configured to move a pipette 23 in an automated manner. The pipette tip extintion 1 here serves as a liquid handling vessel which may in a very simple way be transported on the liquid handling workstation 20 to the place where it is required, without the need of a user. For transporting the liquid handling vessel, only the existing robotic for moving the pipette is required; no further robotic is needed in this case.

Figure 8:
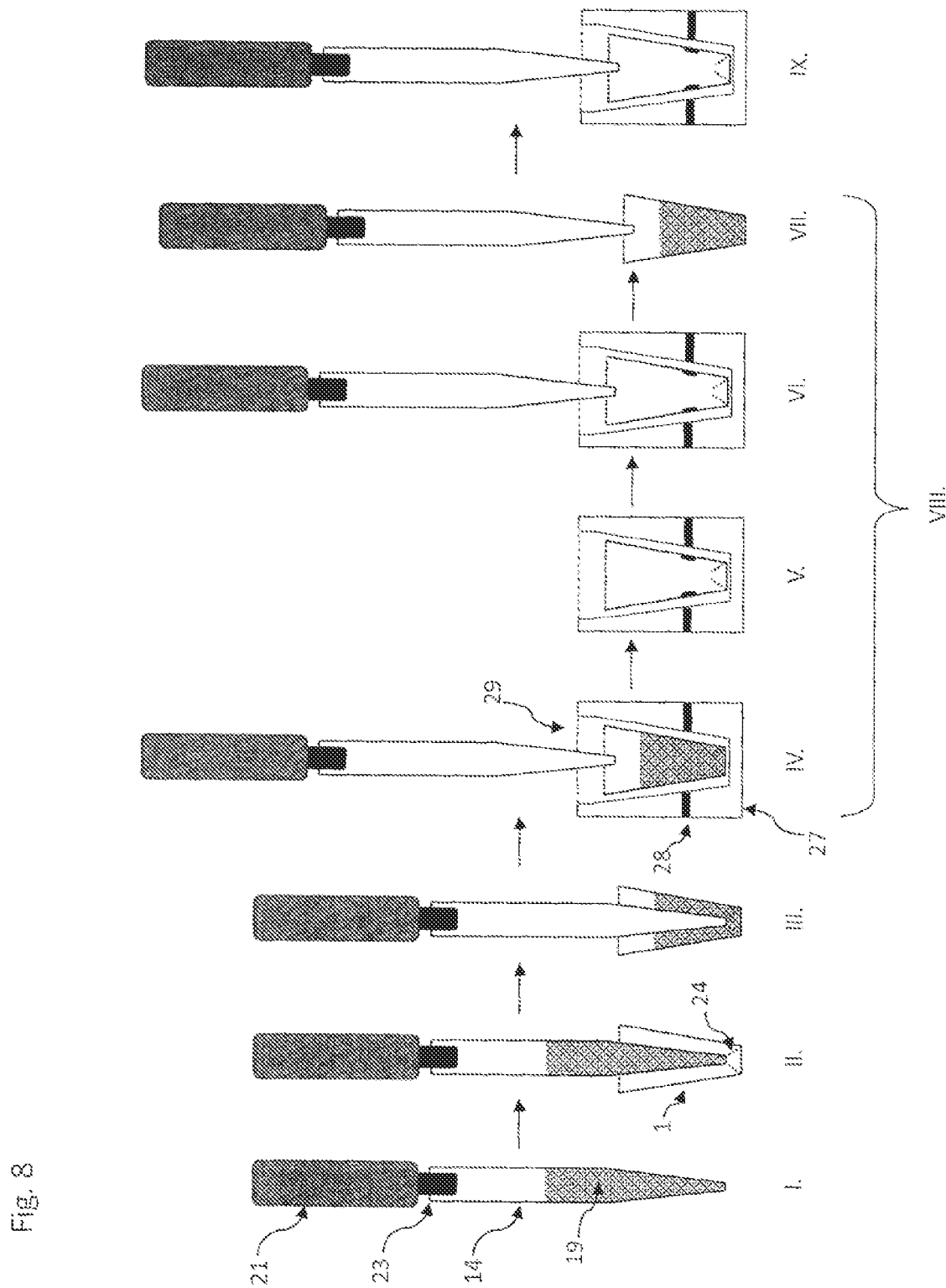

FIG. 8 is a schematic overview of a series of method steps in a particularly useful application of a pipette tip extension 1 in the context of magnetic bead separation. For each method step, a pipette tip 14 is shown which is attached to a pipette 23. The pipette 23 is part of a pipetting head 21; not shown in the present scheme is the liquid handling workstation and the controller 22, with which the pipette 23 is functionally connected.

In step I, a liquid 19 is shown as having been aspirated into a pipette tip 14. The liquid 19 comprises in this case a sample and magnetic beads. The sample or parts of the sample is bound to the magnetic beads. Often used samples to be isolated by magnetic beads are for example nucleic acids. Magnetic beads distributed in the liquid 19 are indicated by the dotted hatching of the liquid 19 in the pipette tip 14.

In step II, the pipette tip 14 with the liquid 19 is shown to have been inserted into a pipette tip extension 1. For this, the pipette tip 14 has been moved by the pipette 23. The movement is under the control of a controller 22 of a liquid handling workstation 20, as it is indicated by the presence of a pipetting head 21, which is connected to the pipette 23. For reasons of clarity, the functionally connected controller 22 and liquid handling workstation 20 are not shown.

The pipette tip 14 has been moved to a storage position where the pipette tip extension 1 has been positioned previously. The pipette tip 14 has then been moved into the pipette tip extension 1 until the pipette tip 14 has reached the required insertion depth and a friction fit connection has been established between the pipette tip 14 and the now attached pipette tip extension 1. In FIG. 8, only the means for controlling the insertion depth are indicated by dotted lined extending diagonally from the bottom 8 of the pipette tip extension 1 towards the proximal end 2, though additional means for establishing a friction fit connection, such as distance elements 10, and/or means for establishing a form-fit-connection are possible, too. Having reached a desired position within the pipette tip extension, the generated assembly of pipette tip extension 1 and pipette tip 14 is now ready for the next steps.

In step III, the liquid 19 with the sample and the magnetic beads has been dispensed into the pipette tip extension 1. The dispensing is under the control of the liquid handling workstation 20. Due to the configuration of the pipette tip extension 1, the liquid 19, which is pushed out of the pipette tip 14, passes an outlet opening 26 of the pipette tip 14 and is moved through the gap g at the bottom of the pipette tip extension 1 into the fluid uptake area 12, which is now restricted not only by the inner side 6 of the exterior wall but also by the pipette tip 14. As the fluid uptake area 12 is in fluid connection with the surrounding atmosphere at the reception aperture 7 of the pipette tip extension 1, the liquid 19 is moved out of the pipette tip 14 and into the pipette tip extension 1 without the requirement of applying additional pressure by the pipetting head 21. This means that the liquid 19 may be dispensed into the pipette tip extension 1 under the same technical setting as a dispensing step into a conventional liquid handling container.

To separate the sample, which is bound to the magnetic beads, the pipette tip extension 1 is moved to a magnetic bead separation device 27 designed for magnetic bead separation. Typically, such a magnetic bead separation device 27 comprises one or more magnets 28 and a tube holder 29 with which a liquid handling vessel is positioned into a magnetizing position. The magnetic bead separation device 27 shown here comprises two magnets at the magnetizing position. The positioning of a pipette tip extension 1 into a magnetizing position, for example, or the withdrawal of a pipette tip 14 from a pipette tip extension 1 in the context of magnetic bead separation is discussed also in FIG. 9.

Typically, known tube holder 29 may be configured to receive standard liquid handling reaction vessels. The tube holder 29 useful for the presently described application may be distinctly configured to the shape and dimensions of the pipette tip extension 1, or the pipette tip extension 1 may be configured as having an outer shape and dimension comparable to those of a standard liquid handling vessel.

In step IV, it is shown that the pipette tip extension 1 with the liquid 19 present in the inner cavity 9 has been moved and positioned into the tube holder 29 of the magnetic bead separation device 27, and into a magnetizing position (see position 2 in FIG. 9), in which the liquid 19 within the pipette tip extension 1 is in the direct influence of the magnetic field of the magnets 28. In this Figure, the now empty pipette tip 14 is drawn out of the pipette tip extension 1, although it is also possible that the pipette tip 14 may remain inserted into the pipette tip extension 1 as long as the liquid 19 is present in the fluid uptake area of the pipette tip extension 1 for the magnetizing reaction.

In step V, the liquid 19 with the sample and magnetic beads has been magnetized, so they were brought into the influence of the magnetic field of the magnets 28 of the magnetic bead separation device 27, and near the magnets 28, the magnetic beads have assembled and formed corresponding pellets. Ideally, the sample of interest such as a specific nucleic acid is bound to the magnetic beads and thereby separated from the remaining liquid.

To obtain the sample of interest, the supernatant is then aspirated into the pipette tip as shown in step VI, to remove supernatant liquid content.

In a particular useful step, a new pipette tip 14 is inserted into the pipette tip extension 1 which is still positioned at the magnetizing position in the magnetic bead separation device 27, and by means of moving the newly inserted pipette tip 14, the pipette tip extension 1 with the assembled magnetic beads is moved away from the magnetizing position and into a separate liquid handling position. Here, for example a washing solution aspirated previous to the picking up of the extension 1 is dispensed into the pipette tip extension 1 and onto the magnetic beads. The magnetic beads are thereby suspended within the washing solution, as indicated again by the dotted hatching. The magnetic beads being redistributed is shown in step VII, for example at the mixing position (see position 3 in FIG. 9) without a magnet nearby.

In an optional step VIII, the separation of the magnetic beads (ideally still comprising bound sample) from the solution by means of the magnetic bead separation device 27, as described for steps IV to VII, is repeated one or more times, to fully remove the previous liquid 19 and/or superfluous components. The advantage is that the pipette tip 14—under the control of the liquid handling workstation 29—may be used to position the pipette tip extension 1 between the magnetizing position and separate liquid handling positions.

After the desired degree of washing, the pipette tip extension 1 is moved by means of the pipette tip 14 to a separate liquid handling position, and the sample of interest is removed from the magnetic beads by dispensing a respective elution buffer into the pipette tip extension 1 and onto the magnetic beads. After the required incubation time, the magnetic beads are separated from the sample which is now dissolved in the elution buffer, for example at an elution position 3 (see FIG. 9) without the influence of a magnet, by means of the magnetic bead separation device 27 as described before, and the elution buffer is aspirated into the pipette tip 14 for further processing, as shown in step IX.

In FIG. 9, a schematic top view onto a magnetic bead separation device 27 comprising a downholder mechanism 32 for handling a pipette tip extension 1 is shown. In this top view three different positions 1, 2, 3 for a pipette tip extension 1 are shown.

Position 1 may be used as a loading position, in which a pipette tip extension 1 may be inserted by a respective movement of an attached pipette tip 14. The loading position is free of a downholder 32 and of a magnet 28 or of the influence of a magnet 28. Position 2 is a magnetizing position, in which a pipette tip extension 1, which is inserted into the magnetic bead separation device 27, is temporarily fixed in position 2, and into which a magnet 28 exercises its influence onto the magnetic beads present in the pipette tip extension 1. Position 3 is for example an elution position or mixing position, which has no influence of a magnet 28, but which has a downholder 32 for temporarily fixing the pipette tip extension within the elution or mixing position.

The magnetic bead separation device 27 in this configuration may be used to withdraw an inserted pipette tip 14 from a pipette tip extension 1, which is positioned within the magnetic bead separation device 27, without using for example an ejection mechanism of the liquid handling workstation 2. In this configuration, the downholder 32 functions as a separate ejection mechanism, as it is configured to temporarily fix an inserted pipette tip extension 1 in the magnetic bead separation device 27. In the positions 2 and 3, which comprise a downholder 32, a pipette tip may be released simply by a vertical movement.

The magnetic bead separation device 27 may be configured that the different positions are accessible by a horizontal movement of the pipette tip extension 1. The respective movement directions are indicated by an double arrow. For example, the pipette tip extension 1 may be moved from the loading position 1 into the magnetizing position 2 by a respective horizontal movement of the attached pipette tip 14. In case the pipette tip 14 shall be withdrawn, a movement may be carried out into a position which comprises the downholder 32.

The downholder 32 may in this case be a plate-like structure which has a cut-out in a size which is adapted to the size of the reception aperture 7 of a pipette tip extension 1. The size of the cut-out allows a pipette tip 14 remaining inserted, then the pipette tip extension 1 is moved below the downholder 32, but additionally is small enough that a pipette tip extension 1 abuts the downholder when an inserted pipette tip 14 shall be withdrawn.

| | REFERENCE SIGNS LIST |
|---|---|
| 1 | pipette tip extension |
| 2 | proximal end |
| 3 | distal end |
| 4 | exterior wall |
| 5 | outer side of 4 |
| 6 | inner side of 4 |
| 7 | reception aperture |
| 8 | bottom |
| 9 | inner cavity |
| 10 | distance element |
| 11 | stop surface |
| 12 | fluid uptake area |
| 13 | medial axis |
| 14 | pipette tip |
| 15 | wall of 14 |
| 16 | collar of 14 |
| 17 | outlet opening of 14 |
| 18 | interior wall of 14 |
| 19 | liquid |
| 20 | liquid handling workstation |
| 21 | pipetting head |
| 22 | controller |
| 23 | pipette |
| 24 | constriction element of 1 |
| 26 | outlet opening of 14 |
| 27 | magnetic bead separation device |
| 28 | magnet |
| 29 | tube holder |
| 30 | pipette tip hosting area |
| 31 | ejection mechanism |
| 32 | downholder |
| g | gap |
| h | gap height |

The invention claimed is:

1. A pipette tip extension attachable to a pipette tip, the pipette tip extension comprising:

a proximal end, a distal end, and an exterior wall extending between the proximal end and the distal end, the exterior wall having an outer side and an inner side and forming at the proximal end a reception aperture for inserting a pipette tip, a bottom at the distal end, an inner cavity enclosed by the inner side of the exterior wall and the bottom, and one or more distance elements arranged at the inner side of the exterior wall and protruding into the inner cavity, the distance elements being dimensioned to establish a fluid uptake area adjacent to the inner side of the exterior wall and the bottom, the fluid uptake area extending from the bottom up to the reception aperture and being in fluid connection with the surrounding atmosphere at the reception aperture; and a constriction element for controlling an insertion depth of a pipette tip within the pipette tip extension, the constriction element defining a gap with a gap height between a distal end of an inserted pipette tip and the distal end of the pipette tip extension, thereby establishing a fluid connection between an inner cavity of an inserted pipette tip and the fluid uptake area, wherein the constriction element is formed by one or more spacing blocks arranged at the bottom in the inner cavity of the pipette tip extension.

2. The pipette tip extension according to claim 1, wherein the bottom and the exterior wall are formed as one piece.

3. The pipette tip extension according to claim 1, wherein the bottom and the exterior wall are impervious to fluids.

4. The pipette tip extension according to claim 1, wherein one or more of the at least one or more distance elements are arranged flush with respect to the proximal end of the pipette tip extension, and/or one or more of the at least one or more distance elements are arranged offset with respect to the proximal end of the pipette tip extension.

5. The pipette tip extension according to claim 1, comprising at least two of the one or more distance elements.

6. The pipette tip extension according to claim 1, wherein at least one of the at least one or more distance elements is configured as an elongated bar which extends along a direction from the proximal end towards the distal end of the pipette tip extension.

7. The pipette tip extension according to claim 1, wherein the exterior wall is a circumferential wall which tapers towards the lower end of the pipette tip extension.

8. An assembly comprising:
a pipette tip for aspirating and/or dispensing a liquid,
a pipette tip extension attached to the pipette tip, the pipette tip extension comprising:
a proximal end, a distal end, and an exterior wall extending between the proximal end and the distal end, the exterior wall having an outer side and an inner side and forming at the proximal end a reception aperture for inserting a pipette tip, a bottom at the distal end, an inner cavity enclosed by the inner side of the exterior wall and the bottom, and one or more distance elements arranged at the inner side of the exterior wall and protruding into the inner cavity, the distance elements being dimensioned to establish a fluid uptake area adjacent to the inner side of the exterior wall and the bottom, the fluid uptake area extending from the bottom up to the reception aperture and being in fluid connection with the surrounding atmosphere at the reception aperture; and a constriction element for controlling an insertion depth of a pipette tip within the pipette tip extension, the constriction element defining a gap with a gap height between a distal end of an inserted pipette tip and the distal end of the pipette tip extension, thereby establishing a fluid connection between an inner cavity of an inserted pipette tip and the fluid uptake area, wherein the constriction element is formed by one or more spacing blocks arranged at the bottom in the inner cavity of the pipette tip extension.

* * * * *